April 15, 1924.
A. B. HENDRICKS, JR
FLOW INDICATOR
Filed Sept. 2, 1919
1,490,901
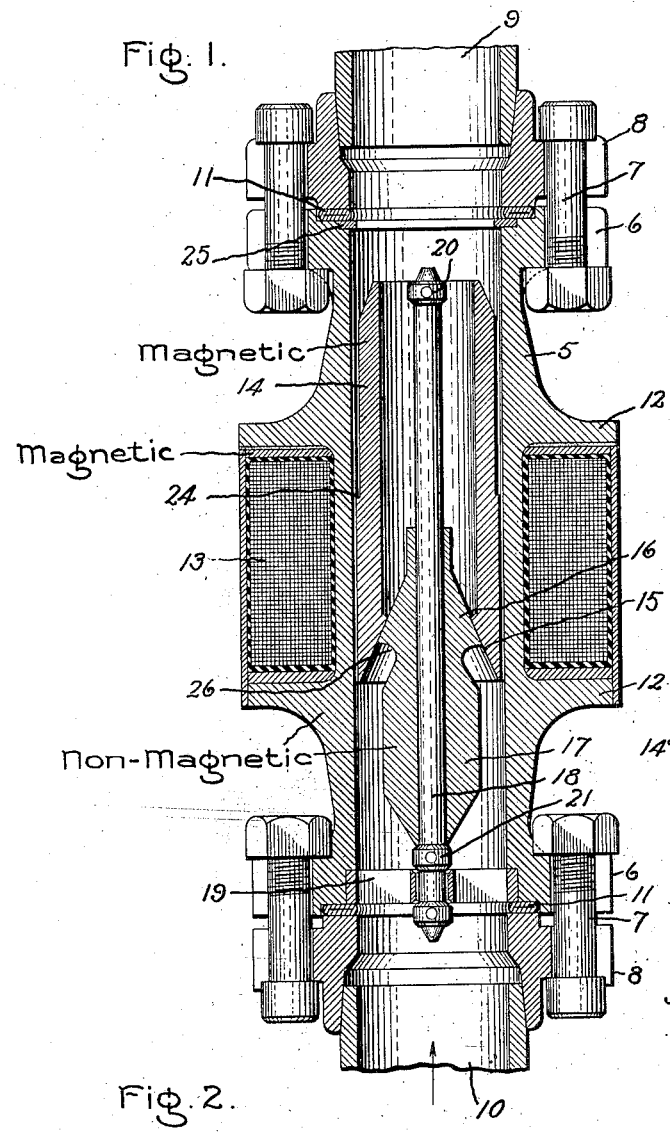
Fig. 1.
Fig. 2.
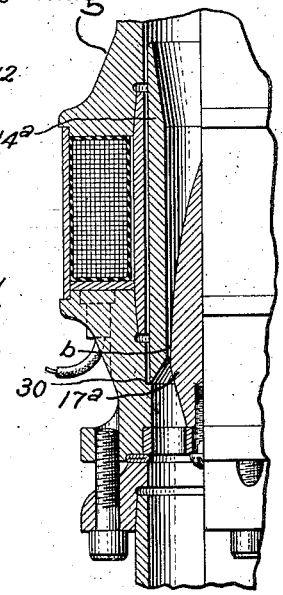
Fig. 3.
Inventor:
Allan B. Hendricks Jr,
by
His Attorney.

Patented Apr. 15, 1924.

1,490,901

UNITED STATES PATENT OFFICE.

ALLAN B. HENDRICKS, JR., OF PITTSFIELD, MASSACHUSETTS, ASSIGNOR TO GENERAL ELECTRIC COMPANY, A CORPORATION OF NEW YORK.

FLOW INDICATOR.

Application filed September 2, 1919. Serial No. 321,163.

*To all whom it may concern:*

Be it known that I, ALLAN B. HENDRICKS, Jr., a citizen of the United States, residing at Pittsfield, in the county of Berkshire, State of Massachusetts, have invented certain new and useful Improvements in Flow Indicators, of which the following is a specification.

In connection with the flow of fluid through conduits it is often desirable to provide a flow indicator which will indicate that the flow is being maintained and which will immediately advise the operator in case the flow ceases. An instance of this is the case of cooling fluids for apparatus such as transformers, bearings, etc., where it is highly important that the flow be always maintained and that the operator be advised immediately should the flow cease so he may take steps to find the trouble and again establish the flow.

The present invention relates to such flow indicators and has for its object to provide an improved indicator, the advantages of which are fully pointed out hereinafter.

For a consideration of what I believe to be novel and my invention, attention is directed to the accompanying description and the claims appended thereto.

In the drawing, Fig. 1 is a longitudinal sectional view of a flow indicator embodying my invention, Fig. 2 shows the manner in which it is connected to an electric circuit, and Fig. 3 shows a modification of the invention.

In carrying out my invention, I insert at a convenient point in the fluid pipe line a short pipe section 5 having flanges 6 at its opposite ends which are fastened by bolts 7 to flanges 8 on adjacent pipe ends 9 and 10, suitable packing members 11 being provided to make a tight joint. Pipe section 5 thus forms a part of the fluid pipe line. Pipe section 5 is made of a suitable non-magnetic and preferably high resistance material such as hard rubber or brass, and is provided with a pair of spaced collars 12 between which is wound a coil of suitable wire forming a solenoid 13. Since pipe section 5 is made of non-magnetic material, it will be clear that the magnetic circuit of solenoid 13 is not closed thereby.

Inside pipe section 5 is an annular core 14 of magnetic material such as iron, provided at its lower end with a tapered seat 15 adapted to engage the tapered head 16 of a member 17 slidably mounted on a post 18. Post 18 is supported at its lower end in a suitable frame 19 carried by pipe section 5, the upper end being free, and has two spaced stops or shoulders 20 and 21 which limit the movements of member 17 on post 18. Member 17 is shown as being in the form of a cylinder with tapered ends so fluid will flow past it smoothly and evenly but it will be understood that it may have other forms, the essential thing being that it have a surface to rest against tapered seat 15 of core 14. Core 14 is also tapered at both ends to provide a sharp edge which will cut through the fluid in the conduit so the core will move readily, particularly when moving downward by gravity as referred to hereinafter. The downward movement of core 14 is limited by head 16 and its upward movement is limited by a shoulder 24 on core 14 which engages a stop ring 25 carried by pipe section 5.

Solenoid 13 is connected to a suitable source of alternating current 22 and in the circuit connections is a signalizing device such as a lamp 23.

When the parts are in the positions shown in Fig. 1, the passage through the conduit is entirely closed except for the clearance between the outside of core 14 and the inside of pipe section 5. Core 14 is within solenoid 13 thus giving the lowest reluctance of the magnet circuit, which means that the current flowing in the winding of the solenoid is a minimum. The arrangement is such that under these circumstances lamp 23 burns dimly. The direction of flow of fluid through the conduit is upward as indicated by the arrow and when fluid strikes the lower ends of core 14 and members 17 it raises them, the two moving together until member 17 strikes stop 20. When this happens, member 17 stops moving but core 14 continues to move and may move until shoulder 24 strikes stop collar 25. As soon as member 17 strikes stop 20 and core 14 moves away therefrom, an annular passage is formed between conical seat 15 and head 16 through which fluid may flow and as soon as this occurs member 17 drops back to its original position. Core 14, however, due to the impetus which it has and still assisted by the flowing fluid continues to move upward until the forces moving it are no longer able to overcome its weight, or until it strikes stop ring 25 when it too will drop back to or substantially to its original position as shown in Fig. 1. The cycle just described is then repeated. When core 14 moves upward it moves out of solenoid 13 with the result that the reluctance of the magnetic circuit is increased and hence the current flowing in the winding of the solenoid increases which causes lamp 23 to become bright; and when core 14 drops back again to a position within the solenoid, lamp 23 again becomes dim. As the cycle described is repeated therefore, lamp 23 will alternately become light and dim, that is, it will flash continuously, and as long as it continues to flash the attendant knows that the flow through the conduit is taking place. A lamp is shown as a signaling device only by way of example and as a preferred form of signal, and it will of course, be understood any suitable signaling arrangement may be used.

The respective weights of core 14 and member 17 and the bottom areas of core 14 and member 17 upon which the fluid pressure acts in lifting them are preferably so proportioned that member 17 receives a greater lifting force than core 14 so that it is not only lifted itself but also assists in lifting core 14, and hence when moving upward member 17 will always be held in contact with core 14. I also preferably provide an undercut near the upper end of member 17 as indicated at 26 and as the core 14 nears the end of its downward movement the stream of fluid directed from tapered seat 15 strikes this undercut and starts member 17 upward to meet core 14.

By varying the weights of core 14 and member 17 and their bottom areas, I may obtain different rates of reciprocation and also adapt the device to different rates of flow.

The clearance between core 14 and conduit section 5 is made comparatively small so that during reciprocation the core will scrape the wall of the conduit, and this coupled with the continuous reciprocation will prevent the accumulation of slime or rust which might cause the apparatus to stick. In any event, however, the device cannot give a wrong indication for the flashing of the lamp can occur only when flow of fluid is taking place.

In some cases it may be not desirable or necessary that there be a continuous reciprocating movement of the core and cooperating member and under these circumstances the cooperating member may be made stationary or it may be dispensed with altogether. The only moving part is then the core 14 and as will be obvious it may be arranged to move an amount dependent upon the flow. With such an arrangement, as the core moves further out of the solenoid the current flowing in the solenoid will increase and the amount of current will be indicative of the flow. If a lamp is used in the indicating circuit then the brightness with which it burns will be an indication of the amount of flow. However, such other means for indicating the amount of current flowing may be used as found desirable.

In Fig. 3 is illustrated an arrangement as referred to in the preceding paragraph wherein the core 14ª alone is movable, the member 17ª being stationary. In this arrangement the core when in its lowest position rests against a stop 30 and there is then a clearance between core 14ª and member 17ª as indicated at $b$ for the initial flow of fluid. Also the core 14ª and member 17ª are preferably so shaped as by making member 17ª cone shaped, so that as core 14ª moves the clearance between it and member 17ª gradually increases. By this arrangement I can obtain the desired movements of core 14ª for changes in flow from minimum to maximum. I also preferably mount the member 17ª somewhat loosely at its base so it can wobble to some extent and hence move relatively to core 14ª to a limited degree. This acts to prevent the accumulation of dirt, sediment and the products of corrosion.

As will be clear, a flow indicator constructed in accordance with my invention, comprises a compact device all contained in a short pipe section which may be readily inserted in and removed from a pipe line; and when removed it can be very easily dismantled, cleaned and repaired. Also, there are no moving parts projecting through the conduit and no stuffing boxes or packings are required.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A flow indicator comprising a pipe section, a solenoid surrounding said pipe section, a current-responsive device in circuit with the solenoid, a core for the solenoid within the pipe section, said core being movable in the direction of flow and being adapted to fall normally in the opposite direction to a position partially at least within the solenoid, and a member which cooperates with the core for obstructing the flow through the conduit when the core is within the solenoid, said core and member having tapered cooperating surfaces whereby movement of the core and member relatively to each other varies the amount of the obstruction they offer to the flow.

2. A flow indicator comprising a pipe section adapted to be inserted in and to become part of a pipe line, a solenoid winding surrounding the pipe section, a current-responsive device in circuit with the solenoid winding, an annular core for the solenoid through which flow may take place, said core being movable out of the solenoid coil in the direction of flow, a member movable in the direction of flow over which the core is normally biased to seat, said member then obstructing the flow through the core, said member and core being adapted to receive the impact of the flow so obstructed, and means for holding the member to less movement than the core whereby separation between them is effected by the impact of the flow to relieve the obstruction.

3. The combination with a fluid conduit, of a solenoid surrounding the same, an indicating instrument in circuit with the solenoid, and flow operated means located wholly within the conduit for varying the reluctance of the magnetic circuit of the solenoid, said means comprising a movable metallic core adapted to fall normally within the magnetic field of the solenoid, a movable non-magnetic member adapted to form with the core when in its normal position a movable obstruction to the fluid flow, means for limiting the movement of such obstruction under impact of the fluid and for separating the core and the member in the course of their movement to relieve the obstruction to the flow whereby the moving elements will tend to return to their normal positions.

4. The combination with a fluid conduit section adapted to be mounted in and to become part of a fluid conducting system, of a solenoid surrounding said section, an indicating instrument in circuit with the solenoid, and flow operated means located wholly within the conduit for varying the reluctance of the magnetic circuit of the solenoid, said means comprising a movable annular metallic core normally biased to lie within the magnetic field of the solenoid, a member forming with the core a normally closed fluid actuated valve tending to obstruct the flow through the conduit section and thereby tending to be moved by the flow so obstructed, and means for causing the valve to open in the course of its movement.

5. The combination with a conduit through which a fluid flows, of a conduit section adapted to be inserted therein, a solenoid surrounding said section, a source of alternating current and a current-responsive device in circuit with the solenoid, and a normally closed valve means within the conduit section tending to obstruct the flow therethrough, said valve means being of metal and biased to lie normally within the magnetic field of the solenoid, said valve means being movable in the direction of flow by the fluid flow obstructed by its closure and comprising a member with means for limiting its movement, and a second member with means for limiting its movement less than the movement of the first named member whereby its movement under the fluid action tends to separate the members and relieve the obstruction.

6. The combination with a conduit through which a fluid flows, of a conduit section adapted to be inserted therein, a solenoid coil surrounding said section, a source of alternating current and a current-responsive indicating instrument in circuit with the solenoid coil, a normally closed valve means comprising a valve and a valve seat located within the conduit section, said valve means being biased to lie within the magnetic field of the solenoid and adapted through impact surfaces thereon provided to be moved in the direction of flow out of said magnetic field by the impact of the fluid, and abutment stops carried by the conduit section to meet the moving valve means, said stops being arranged to successively stop the valve and the seat such that said valve means is operated thereby to permit fluid flow.

7. The combination with a conduit through which a fluid flows, of a conduit section therein of non-magnetic material, a solenoid surrounding said section, two movable members in said conduit section one of which forms a magnetic core for said solenoid, and stop means for limiting the movements of said members but which permits one of said members to have a greater movement than the other.

8. The combination with a conduit through which a fluid flows, of a conduit section therein of non-magnetic material, a solenoid surrounding said section, two movable members in said conduit section one of which forms an annular magnetic core for said solenoid, said other member being adapted to close the opening through the one member when they are in certain positions, and stop means for said members which permit one of them to have a greater longitudinal movement than the other.

9. The combination with a conduit through which a fluid flows, of a conduit section therein of non-magnetic material, a solenoid surrounding said section, an annular core of magnetic material located in said conduit section and means for causing said core to continuously move out of and into said solenoid as long as a fluid is flowing through said conduit.

10. The combination with a conduit through which a fluid flows, of a conduit section therein of non-magnetic material, a solenoid surrounding said section, an annular core of magnetic material located in said conduit section, and means actuated by the flow of fluid through said conduit for effecting a continuous reciprocating movement of said core.

11. In an indicator, a conduit section of non-magnetic material, a winding thereon forming a solenoid, an annular core inside the conduit section and adapted to be moved longitudinally thereof, said core having a tapered seat, a post in the conduit section, a member slidable thereon and having a surface against which said tapered seat rests whereby the member closes the passage through the core, and stops for said member, flow through said conduit section acting first to move said core and member until said member strikes a stop after which said core moves alone whereby fluid may flow through it.

12. The combination with a conduit through which a fluid flows, of a conduit section therein of non-magnetic material, a solenoid surrounding said section, an annular core of magnetic material in said section, said core having a tapered seat at its lower end, a post in the conduit section having spaced stops, a member on said post adapted to reciprocate between said stops, said member having a surface against which said tapered seat is adapted to rest, and a source of alternating current and an indicator connected to said solenoid.

13. The combination with a conduit through which a fluid flows, of a conduit section therein of non-magnetic material, a solenoid surrounding said section, an annular core of magnetic material in said section, said core having a tapered seat at its lower end, a post in the conduit section having spaced stops, a member on said post adapted to reciprocate between said stops, said member having a surface against which said tapered seat is adapted to rest and an annualar groove below said surface to which fluid is directed from said tapered seat, and a source of alternating current and an indicator connected to said solenoid.

14. In combination, a conduit section adapted to be inserted in a pipe line, a portion at least of said section being of non-magnetic material, a solenoid coil surrounding said non-magnetic portion, a movable member within the section, said member being of metal and being in the form of a hollow cylinder lying coaxial with the solenoid coil and adapted to fall normally within the magnetic influence of the solenoid coil, means actuated by the flow of fluid through said conduit section for effecting a continuous reciprocating movement of said member, and an indicating means in circuit with the solenoid coil responsive to changes in current therethrough.

15. In combination, a conduit section, partially at least of non-magnetic material, adapted to be inserted in a fluid pipe line, a solenoid coil surrounding the same, a movable annular core within said conduit section, said core being of metal and adapted to fall normally within the magnetic field of the solenoid, said core being provided with impact surfaces to meet the fluid flow, a member of non-magnetic material within said conduit section adapted to extend within the confines of the annular core to obstruct the fluid flow therethrough, said member being provided with impact surfaces cooperating with those on the core whereby said core and member are moved in the direction of flow by the impact of the fluid thereupon directed, stop means for effecting a separation of the core and member after a certain limited movement whereby the obstruction to the fluid flow is relieved, and a current responsive indicating instrument in the solenoid coil circuit.

16. In combination, a conduit section, partially at least of non-magnetic material, adapted to be inserted in a pipe line, a solenoid coil surrounding the same, a source of alternating current and an indicating instrument in circuit therewith, a movable metallic core within the conduit section adapted to lie in its normal position, partially at least within the confines of the solenoid coil, a passageway through the core for the fluid flow, a member of non-magnetic material within the conduit section adapted to obstruct the flow through said passageway when the movable core is in its normal position, the movable core and member being provided with fluid impact and deflecting surfaces cooperating to cause the core to move under fluid pressure, and means for opening the passageway sufficiently to admit flow therethrough after a limited movement of said core.

In witness whereof, I have hereunto set my hand this 28th day of August, 1919.

ALLAN B. HENDRICKS, Jr.